United States Patent [19]
Marble et al.

[11] Patent Number: 5,374,192
[45] Date of Patent: Dec. 20, 1994

[54] CHILD SURVIVAL AND TRAINING APPARATUS

[76] Inventors: Cheral A. Marble; Alan F. Marble, both of P.O. Box 80188, Billings, Mont. 59102

[21] Appl. No.: 122,975

[22] Filed: Sep. 17, 1993

[51] Int. Cl.5 .............................................. G09B 19/00
[52] U.S. Cl. .................................... 434/236; 434/433; 210/505; 441/88; 441/89; 441/125; 446/72; D23/209
[58] Field of Search ................ 434/223, 236, 433; 116/137 R, 26; 210/505; 441/88, 89, 125; 446/72-74, 188, 369; D21/237; D23/209

[56] References Cited

U.S. PATENT DOCUMENTS

| | | | |
|---|---|---|---|
| 2,591,379 | 4/1952 | Schradermeier | 446/72 |
| 4,111,813 | 9/1978 | Preus | 210/505 X |
| 4,668,201 | 5/1987 | Stark | 441/88 |
| 4,821,670 | 4/1989 | Foxcroft | 116/137 R |
| 5,002,511 | 3/1991 | Maki | 446/74 X |

FOREIGN PATENT DOCUMENTS

| | | | |
|---|---|---|---|
| 0523977 | 2/1956 | Belgium | 446/188 |
| 0269431 | 6/1988 | European Pat. Off. | 446/73 |

OTHER PUBLICATIONS

"Pelaspan Expandable Polystyrene", Catalog 171-90, Dow Chemical Company, Feb. 1958, p. 32.

*Primary Examiner*—Gene Mancene
*Assistant Examiner*—Jeffrey A. Smith
*Attorney, Agent, or Firm*—Lewis C. Lee

[57] ABSTRACT

A survival and training apparatus for children is constructed in the form of a teddy bear. The teddy bear has an exterior casing formed of multiple durable materials including a fluorescent fabric of lime yellow color that is visible during daytime conditions and a reflective fabric to facilitate visibility during nighttime conditions. A third fabric which stores light energy during the day and then emits it at night can also be included in the casing materials. The teddy bear also includes in interior filling material of polystyrene beads that facilitates human body heat insulation when the survival teddy bear is held by the child and imparts buoyancy to enable the survival teddy bear to operate as a floatation device. The survival apparatus hits a pocket formed in the back to receive and warm a child's hands. A whistle is attached via a chord to the pocket and can be alternatively inserted into the pocket for storage and retrieved therefrom for use by the child. The survival teddy bear is also equipped with a detachable blanket housed in the pocket which can be removed for additional warmth and protection from poor weather conditions. The apparatus is well suited for helping to train a child in the survival rules and techniques necessary for safe venture into wilderness areas.

18 Claims, 4 Drawing Sheets

FIG. II

CHILD SURVIVAL AND TRAINING APPARATUS

TECHNICAL FIELD

This invention relates to survival, rescue, and training devices for children.

BACKGROUND OF THE INVENTION

Wilderness areas, such as the mountainous backcountry of Montana, are very popular as beautiful vacation destinations. The wilderness offers memorable adventures with its breathtaking views and unique wildlife encounters that are unparalleled by other family ventures.

The wilderness can also be a potentially dangerous environment, particularly for children who have become separated from their parents. When lost in the outdoors, children can generally take care of their physical needs. When wet, they find dry areas. When cold, they seek shelter. When tired, they sleep. Children typically have more trouble controlling their emotional fear. The trauma of being separated from parents in an unknown and scary wilderness understandably creates extreme anxiety in a small child.

Another hazard associated with children who are lost in the wilderness concerns the tremendous difficulty of searching for them. Due to their small size, children are not easy to spot from surveillance aircraft or during ground rescue sweeps, particularly if they are not properly dressed in easily visible clothing. Visual contact with a lost child is further impaired by darkness during nighttime hours.

Accordingly, there is a need for an apparatus to pre-educate children on survival techniques and to assist children in the event that they become separated from their parents and lost in the wilderness. The apparatus should aid the child physically and emotionally and help facilitate the rescue efforts of workers attempting to locate the child. This invention provides such an apparatus.

BRIEF DESCRIPTION OF THE DRAWINGS

One or more preferred forms of the invention are described herein with reference to the accompanying drawings. The drawings are briefly described below.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Figure 1:
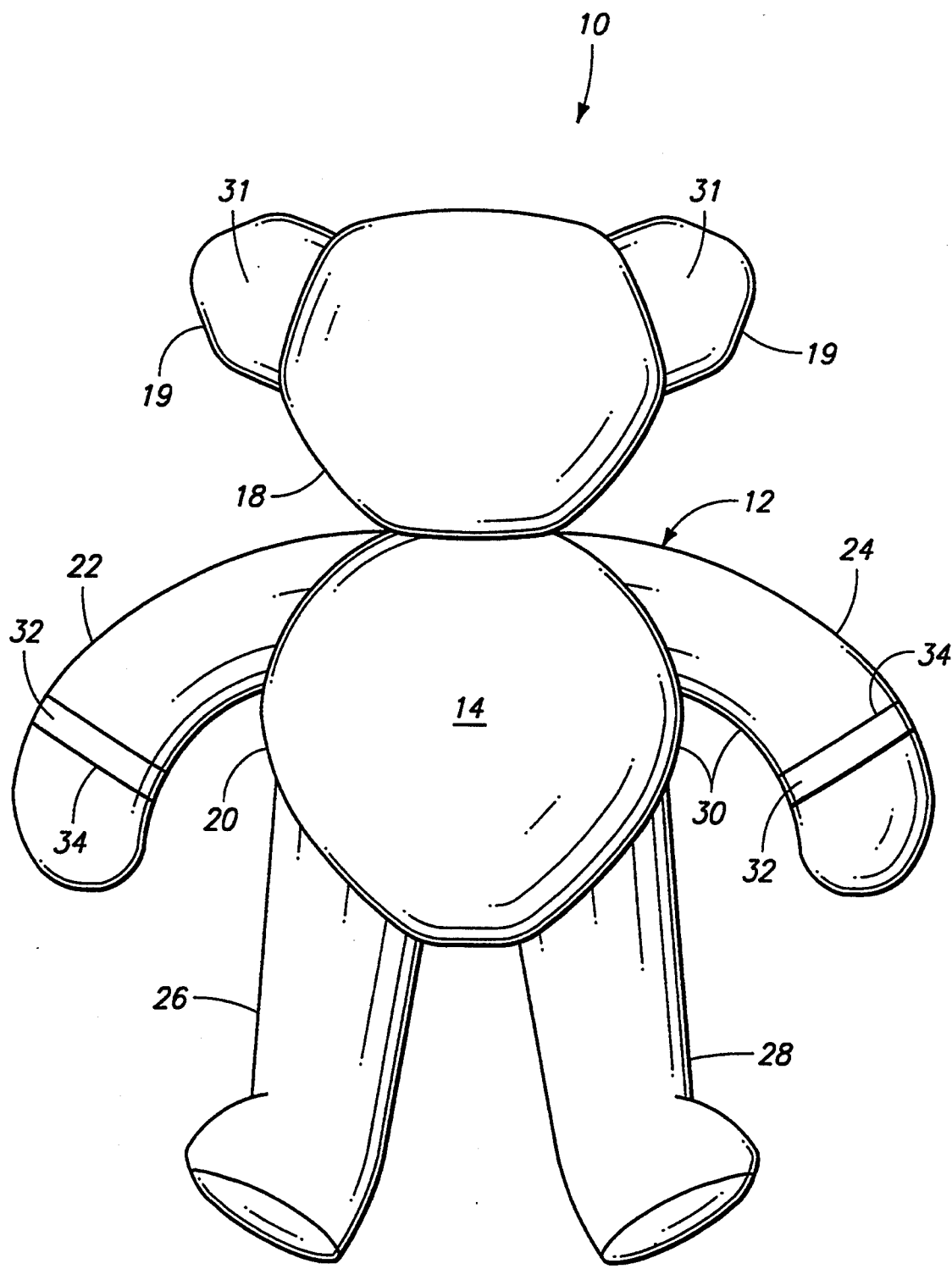
FIG. 1 is a diagrammatical front view of a survival and training apparatus according to this invention. The apparatus is illustrated as being embodied in the form of a teddy bear.
Figure 2:
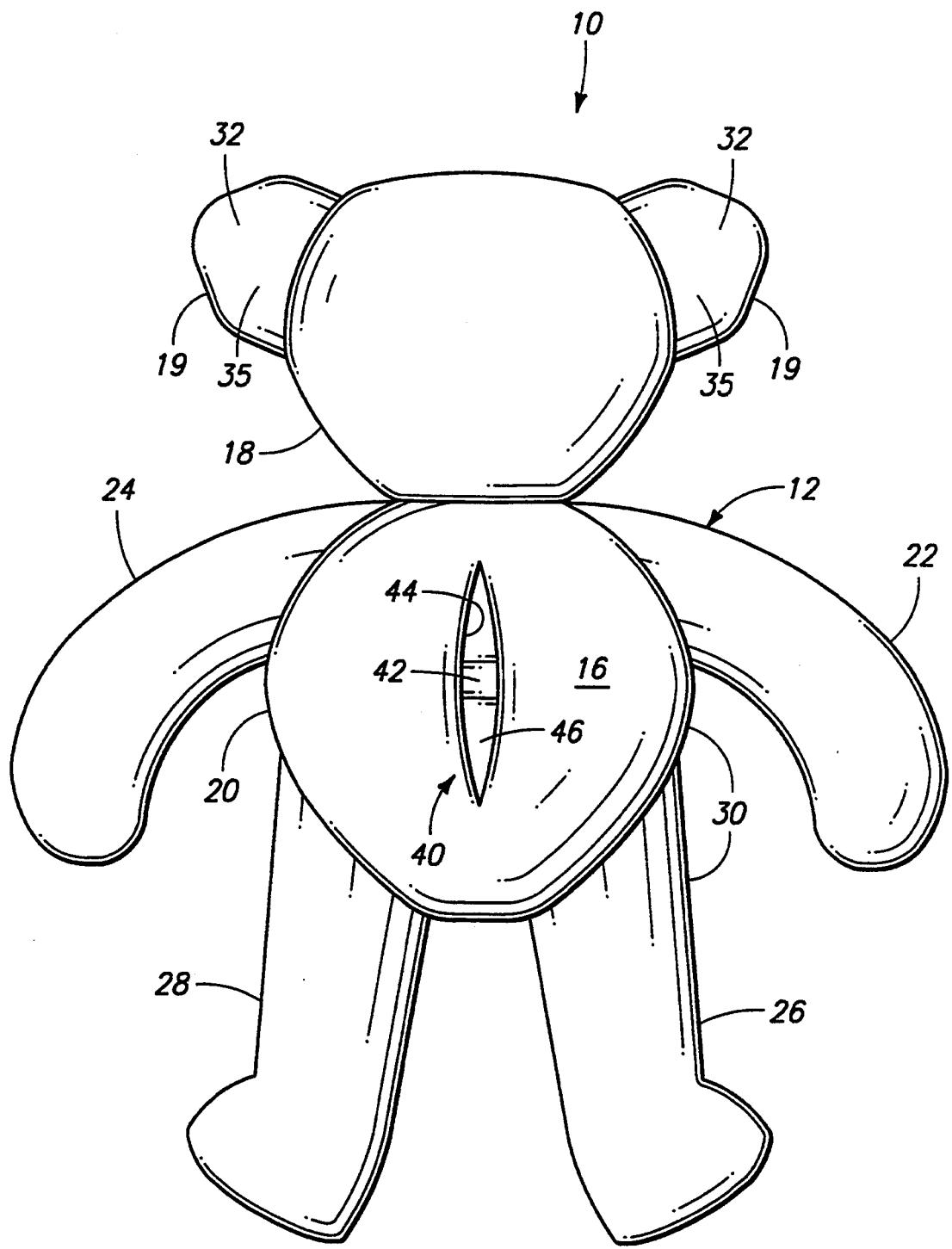
FIG. 2 is a diagrammatical back view of the survival and training apparatus.

FIGS. 1 and 2 diagrammatically illustrate a survival and training apparatus 10 according to this invention. Apparatus 10 is designed to assist a child who becomes separated from his or her parents and lost in the wilderness or other foreign terrain. The apparatus also aids rescue efforts of those attempting to locate the lost child.

Apparatus 10 includes a deformable body 12 having a front 14 and a back 16. It is desirable that body 12 be configured in a shape that appeals to a child so that he or she will respond amicably to the survival and training apparatus as a play companion, in the same way that a child befriends a stuffed animal. Such a body configuration is advantageous because it allows the survival and training apparatus 10 to become a trail companion during trips into the backcountry or wilderness. In the unfortunate event that the child becomes lost, the apparatus serves to help a child control his or her emotions by offering friendship during times of fear, isolation, loneliness, and boredom and by providing protection (at least in the child's mind) from the surrounding dangers.

Body 12 is illustrated in its most preferred form of a teddy bear. Other types of animal shapes (such as dogs, cats, or kangaroos) are also preferred, with non-animal shapes that appeal to children being less preferred. The teddy bear body 12 has a head 18 with ears 19, a torso 20, four appendages in the form of two arms 22 and 24, and two legs 26 and 28. Although not shown, a facial pattern can be applied to the front of head 18. The teddy bear body 12 has a size and weight which is suitable to be grasped, lifted up, and carried by a small child. The teddy bear body is preferably less than 2 pounds, with an example weight being approximately seven ounces.

The teddy bear-shaped body 12 consists of an exterior coal or casing 30 and an interior filling material that fills out the casing to give form to the desired shape. The casing and filling material are selected to provide a soft, "squishy" tactile feel so that a child can hug and cuddle the survival and rescue teddy bear in a similar fashion as he or she would any other stuffed animal.

The exterior casing 30 is formed of multiple durable materials that resist tearing and withstand the abuses commonly inflicted by small children on their toys as well as the abuses inherently administered by nature. Materials formed of 420/430 Nylon fabrics are suitable as these fabrics are durable, tear resistant, and flame retardant and also dry rapidly. The casing materials include a Nylon fabric of bright color to promote high visibility during daytime conditions. An ultraviolet activated fluorescent fabric of lime yellow color is most preferred because it can be spotted at considerable distances. This is particularly advantageous in that rescue workers are more likely to see the bright fabric of apparatus 10 during aircraft surveillance or ground rescue sweeps as compared to trying to spot a small child dressed in dull clothes.

For purposes of style and product appeal, more than one color can be used, although it is desired that the highly visible, bright color (i.e., the fluorescent lime yellow color) be used predominately on the exterior coating. For example, the lime yellow fabric can be used on head 18, the back of torso 20, both arms 22 and 24, and both legs 26 and 28, while a second color (for instance, blue) can be employed on the front of torso 20 and the insides 31 of ears 19.

The casing materials also include a reflective Nylon fabric 32 to facilitate visibility during nighttime conditions. Such a fabric reflects a light, bright color when independent light sources (i.e., vehicle headlights, aircraft spotlights, or handheld flashlights) are directed at the material. The reflective fabric 32 preferably covers less than a predominate amount of the exterior casing 30, and more preferably, is used at individual, discrete locations on the apparatus. In FIGS. 1-4, reflective fabric 32 is embodied as strips 34 on arms 22 and 24 of the teddy bear body and on the backs 35 of ears 19. One preferred material is a lime yellow reflective fabric sold by 3M Corp. under the trademark SCOTCHLITE TM. The color of this reflective fabric is substantially similar to the lime yellow color of the fluorescent fabric.

According to another embodiment of this invention, the casing materials include a unique fabric which stores light energy when struck by natural or artificial light, and then emits the light energy during periods of darkness. The fabric is advantageous in that it can generate a nighttime glow without an electrical power supply. This energy storing fabric could be used, for example, in place of the fluorescent fabric on the head, or applied as strips adjacent to the reflective strips 34 on arms 22 and 24. The light emitting fabric will assist nighttime rescue efforts by providing a more visible target. Additionally, the glowing teddy bear essentially functions as a nightlight for the child to help calm his or her fears, which are typically heightened during the dark night hours. An example material is a coated fabric sold under the trademark VALMEX LUMEX TM, by Mehler Technische Textilien GmbH, a German company.

The casing materials are sewn or otherwise joined to form an outer skin of the teddy bear body 12, whereby the tailored casing defines an interior. Before the casing is entirely stitched closed, a filling material (not shown) is provided within the casing interior. The filling material comprises polystyrene beads which serve two purposes. First, the polystyrene beads facilitate human body heat insulation and core rewarming (i.e., rewarming of core body parts including chest and head) when the teddy bear 12 is held close or cuddled by the child in the Heat Escape Loss Position (HELP). This advantage helps the child combat hypothermia (the number one cause of death in backcountry incidents) by substantially preventing or impeding heat loss, and in some cases, by rewarming the child. Second, the polystyrene beads are buoyant. The teddy bear body 12 can therefore be used as a floatation aid. The survival teddy bear can remain buoyant even when completely full of water. A teddy bear according to this invention (having a weight of less than one pound) has been found to support a full grown adult above water.

The casing materials are preferably comprised of porous fabric (such as Nylon) that is permeable to water but impermeable to particles and contaminates carried by water, such as small rocks, sand, or forms of vegetation. In this manner, the survival and training apparatus 10 can be effectively operated as a filtration system for filtering particles and contaminates from the water. To operate the filtration system, a child (or adult) submerges the teddy bear body 12 in a small stream or spring to allow the water to flow into the casing interior. The body is then lifted out of the water and held in an upright position. The water that drains from the teddy bear body is substantially free of large contaminates and particles. This filtration system is relatively crude, however, and does not remove many harmful organisms such as Giardia, bacteria, and viruses.

Figure 3:
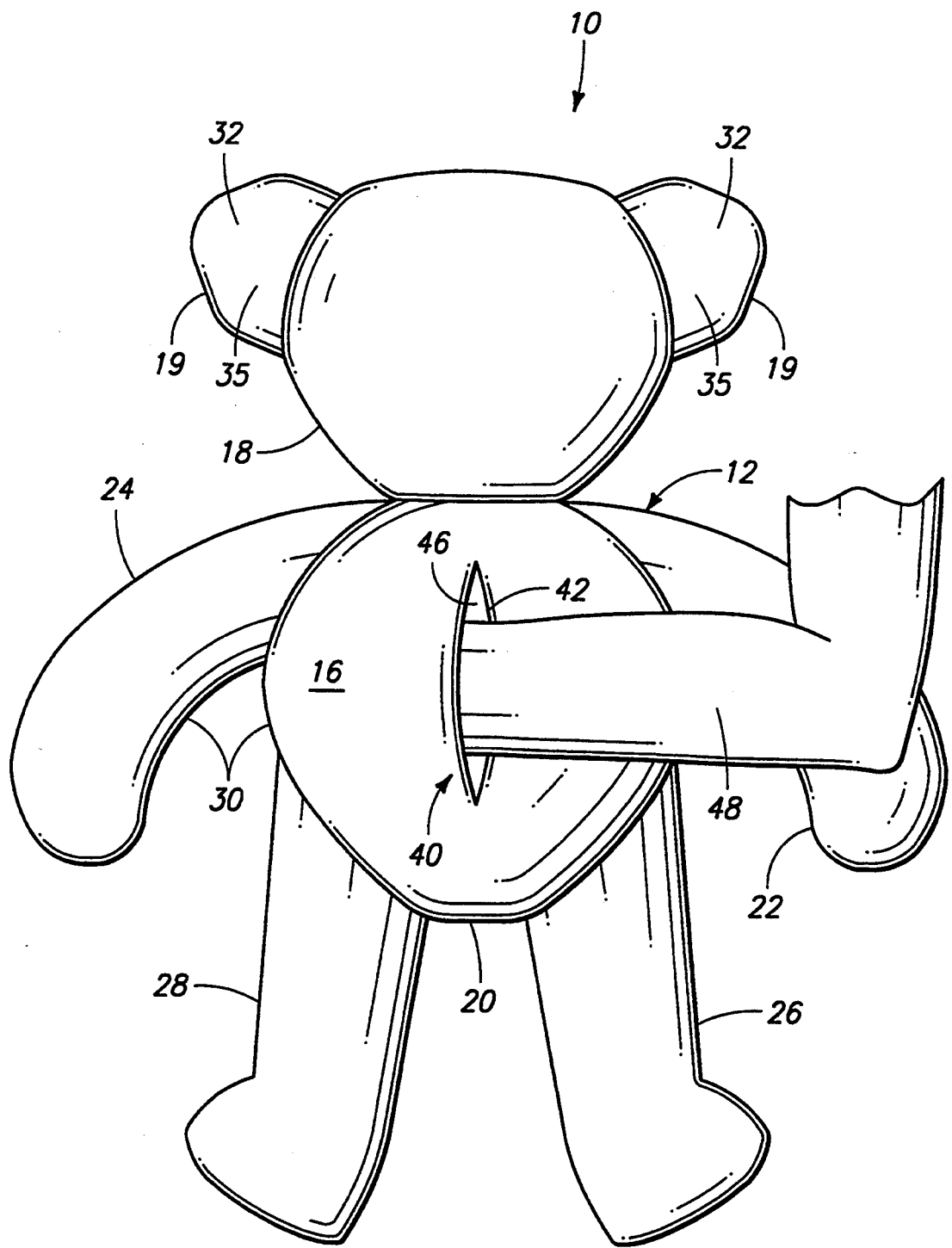
FIG. 3 is similar to FIG. 2, but further shows a child's hand positioned in a pocket provided in the back of the apparatus.
Figure 4:
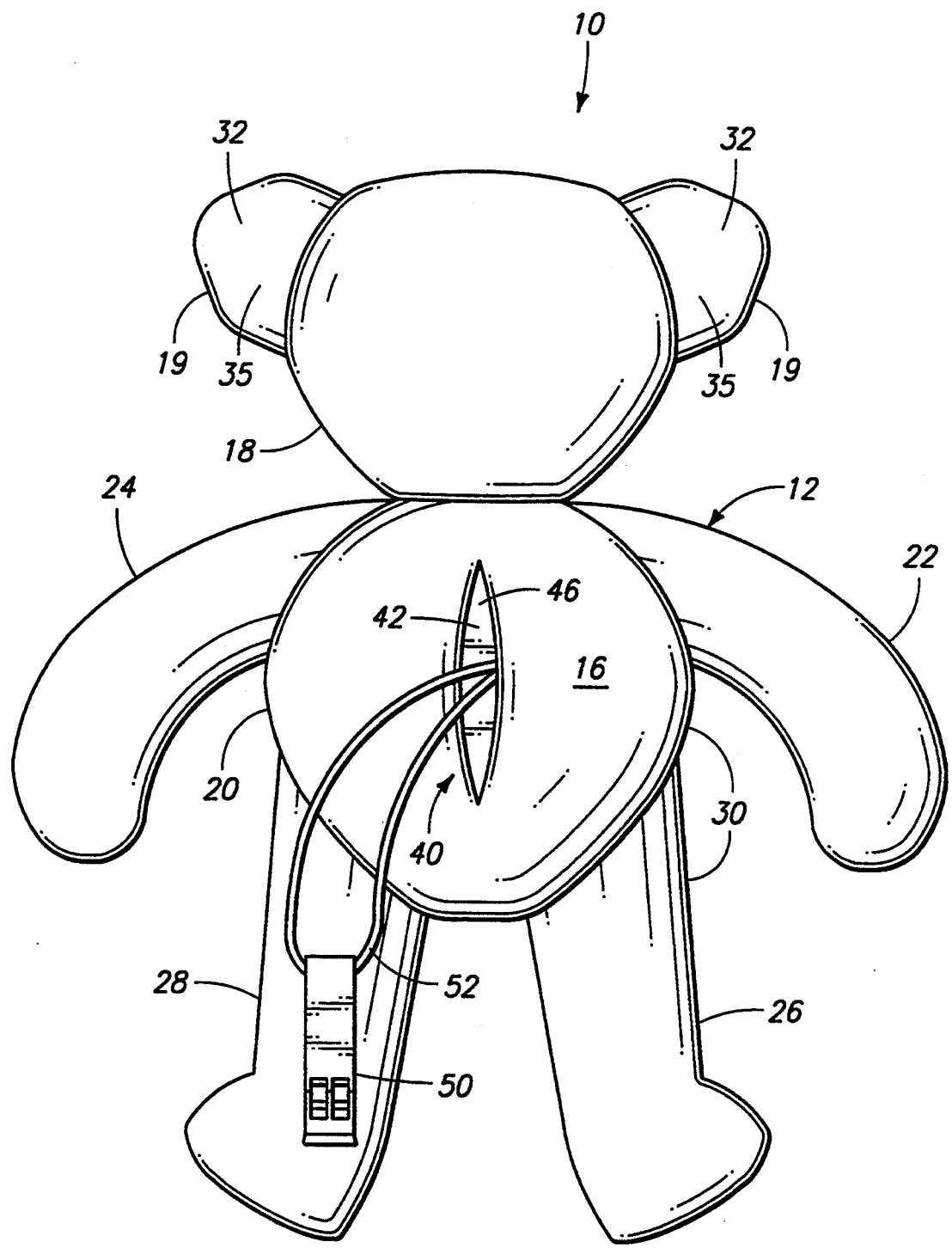
FIG. 4 is similar to FIG. 2, but further shows a whistle removed from the pocket at the back of the apparatus.

As shown in FIGS. 2-4, the survival, teddy bear-shaped apparatus 10 has a pouch or pocket 40 formed in the back 16 of torso 20. Pocket 40 includes an elongated opening 42 aligned vertically from the upper torso near head 18 to the lower torso. A lining 44 extends into body 12 to define therein a cavity 46. The pocket lining 44 separates the polystyrene beads contained within body 12 from the cavity 46.

The pocket cavity 46 has a selected size suitable to receive at least one hand (and preferably, two hands) of a child. FIG. 3 illustrates a child's arm 48 extending around the teddy bear and a hand (not shown) inserted into the pocket cavity 46. The pocket provides a warm haven for a child's hands to further reduce body heat loss.

As shown in FIG. 4, the survival, teddy bear-shaped apparatus 10 has a whistle 50. The whistle is attached via a flexible and durable chord 52 through pocket cavity 46 to lining 44. In this fashion, whistle 50 can be alternatively inserted into pocket cavity 46 for storage (FIGS. 2 and 3) or retrieved therefrom for use by the child (FIG. 4). The whistle is preferably designed to generate audible tones and pitches that can be perceived over long distances and in unfavorable weather conditions, such as rain and wind. An example whistle for use in this invention is a pea-less whistle sold under the trademark FOX 40® by Fortron, Inc., a Canadian company. A whistle is most preferred, but other audible signal means (both manual and non-manual) for generating audible sounds can be employed.

In another embodiment, survival and training apparatus 10 is equipped with a removable, emergency blanket (not shown) which is stored within pocket 40. The blanket is preferably formed of Mylar TM and is waterproof, windproof, and compactible. The blanket is semi-permanently sewn to the inside pocket lining 44, or alternatively housed in a detachable tear-away pouch that is attached to the pocket lining, so that the blanket does not inhibit a child's normal play interaction with the teddy bear. When the need arises, however, the blanket can be easily removed and used for warmth or as a shield to adverse environmental conditions.

The survival and training apparatus 10 is particularly effective for use as a training tool to teach children how to survive in the backcountry when faced with dangerous, and often life threatening situations and natural hazards. The child can be taught to grasp and hold the teddy bear while postured in the Heat Escape Loss Position (HELP) to reduce the threat of hypothermia. The child can also be instructed to blow whistle 50 in periodic sessions, with each session consisting of three bursts. The three bursts represent the international distress signal.

In addition to these basic instructions involving interaction with the survival teddy bear, other survival techniques can be taught using the friendly teddy bear as a way to enhance memory retention. For example, the child can be taught the basic rules of child survival which include: (1) stay together, but if separated, (2) stop, (3) sit down, (4) stay put and do not wander about; while waiting for rescue, (5) stay warm, (6) stay dry, (7) use international distress signals by blowing the rescue whistle three times, and while listening for a response, (e) set the teddy bear (or other bright object) out in the open to visually signal aircraft or rescuers. In the event the child becomes lost, the teddy bear apparatus will function as a reminder to the child to implement these basic procedures. This will assist in reducing the apprehension and fear caused by the trauma of being separated from the child's family.

In compliance with the statute, the invention has been described in language necessarily limited in its ability to properly convey the conceptual nature of the invention.

Because of this inherent limitation of language, it must be understood that the invention is not necessarily limited to the specific features described and shown, since the means herein disclosed comprise merely preferred forms of putting the invention into effect. The invention is, therefore, claimed in any of its forms or modifications within the proper scope of the appended claims appropriately interpreted in accordance with the doctrine of equivalents.

We claim:

1. A survival and training apparatus for children comprising:

an exterior casing of durable and bright-colored material that is visible during daytime conditions, the casing being formed in a shape that appeals to a child, the casing defining an interior;

a filling material of polystyrene beads provided within the casing interior, the polystyrene beads facilitating human body heat insulation when the survival and training apparatus is held by the child and imparting buoyancy to enable the survival and training apparatus to float;

a pocket having (1) an opening in the exterior casing and (2) a lining extending into the casing interior to define therein a cavity of selected size suitable to receive at least one hand of a child, the pocket lining separating the polystyrene beads from the cavity; and an audible signal means for generating audible sounds, the audible signal means being attached via a flexible coupling to the pocket lining and being alternatively insertable into the pocket cavity for storage and retrievable from the pocket cavity for use.

2. A survival and training apparatus according to claim 1 wherein the casing includes a reflective fabric.

3. A survival and training apparatus according to claim 1 wherein the casing includes a fluorescent fabric.

4. A survival and training apparatus according to claim 1 wherein the casing includes a fabric of a lime yellow color.

5. A survival and training apparatus according to claim 1 wherein the casing includes a fluorescent fabric of a lime yellow color that is highly visible during daytime conditions and a reflective fabric that is visible during nighttime conditions when an independent light source is directed thereto.

6. A survival and training apparatus according to claim 1 wherein the casing includes a fabric which stores light energy when struck by light, and emits light energy during periods of darkness.

7. A survival and training apparatus according to claim 1 wherein the casing material comprises a porous fabric that is permeable to water but impermeable to particles carried by water, the survival and training apparatus being effective to filter particles from the water.

8. A survival and training apparatus according to claim 1 wherein the casing is formed in the shape of an animal.

9. A survival and training apparatus according to claim 1 wherein the casing is formed in the shape of a teddy bear.

10. A survival and training apparatus according to claim 1 wherein the audible signal means comprises a whistle.

11. A survival and training apparatus according to claim 1 further comprising a removable blanket provided within the pocket.

12. A survival and training apparatus for children comprising:

an animal-shaped, deformable body having a front and back and being of a size and weight suitable to be grasped and carried by a child, the animal-shaped body comprising:

an exterior casing formed of multiple durable materials including a fluorescent fabric of lime yellow color that is visible during daytime conditions and a reflective fabric that is visible during nighttime conditions when an independent light source is directed thereto; and polystyrene beads provided within the casing to fill out the casing into the animal-shaped body, the polystyrene beads facilitating human body heat insulation when the animal-shaped body is held by the child and imparting buoyancy to enable the animal-shaped body to float;

a pocket formed in the animal-shaped body, the pocket having a lining extending into the body to define therein a cavity of selected size suitable to receive at least one hand of a child, the pocket lining separating the polystyrene beads from the cavity; and a whistle attached via a chord to the pocket lining, the whistle being alternatively insertable into the pocket cavity for storage and retrievable from the pocket cavity for use.

13. A survival and training apparatus according to claim 12 wherein the animal-shaped body is in the form of a teddy bear.

14. A survival and training apparatus according to claim 12 wherein the pocket is formed in the back of the animal-shaped beady.

15. A survival and training apparatus according to claim 12 wherein:

the animal-shaped body has appendages and a head with ears; and the reflective fabric is provided on at least one of (1) an ear and (2) an appendage.

16. A survival and training apparatus according to claim 12 wherein the casing materials further include a porous fabric that is permeable to water but impermeable to particles carried by water, the survival and training apparatus being effective to filter particles from the water.

17. A survival and training apparatus according to claim 12 wherein the casing materials further include a fabric which stores light energy when struck by light, and emits light energy during periods of darkness.

18. A survival and training apparatus according to claim 12 further comprising a removable blanket provided within the pocket.

* * * * *